(12) United States Patent
Barbu et al.

(10) Patent No.: US 9,069,971 B2
(45) Date of Patent: Jun. 30, 2015

(54) METHOD FOR TESTING THE SECURITY OF AN ELECTRONIC DEVICE AGAINST AN ATTACK, AND ELECTRONIC DEVICE IMPLEMENTING COUNTERMEASURES

(71) Applicant: OBERTHUR TECHNOLOGIES, Colombes (FR)

(72) Inventors: Guillaume Barbu, Colombes (FR); Alberto Batistello, Colombes (FR); Christophe Giraud, Colombes (FR); Soline Renner, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/021,868

(22) Filed: Sep. 9, 2013

(65) Prior Publication Data

US 2014/0075203 A1    Mar. 13, 2014

(30) Foreign Application Priority Data

Sep. 10, 2012 (FR) .................................... 12 58489

(51) Int. Cl.
*G06F 11/30* (2006.01)
*G06F 21/57* (2013.01)
*G06F 7/72* (2006.01)

(52) U.S. Cl.
CPC .............. *G06F 21/577* (2013.01); *G06F 7/723* (2013.01); *G06F 2207/7271* (2013.01)

(58) Field of Classification Search
CPC .................. G06F 21/577; G06F 7/723; G06F 2207/7219; G06F 2207/7271

USPC ............................................ 713/189; 380/28
See application file for complete search history.

(56) References Cited

U.S. PATENT DOCUMENTS

2009/0110187 A1*    4/2009    Fischer ........................... 380/28
2010/0223478 A1*    9/2010    Ebeid et al. .................... 713/190

OTHER PUBLICATIONS

French Search Report and Written Opinion dated Sep. 2, 2013 for corresponding French Application No. 1258489, filed Sep. 10, 2012.
Johannes Blomer et al: "New Partial Key Exposure Attacks on RSA", Advances in Cryptology, CRYPTO 2003. Lecture Notes in Computer Science, vol. 2729, Jan. 1, 2003, pp. 27-43, XP055076976.

(Continued)

*Primary Examiner* — Dant Shaifer Harriman
*Assistant Examiner* — Abiy Getachew
(74) *Attorney, Agent, or Firm* — David D. Brush; Westman, Champlin & Koehler, P.A.

(57) ABSTRACT

A method of testing security of an electronic device against a combination of a side-channel attack and a fault-injection attack implemented during a method of cryptographic processing that includes: delivering a message signature based on a secret parameter and implementing a recombination of at least two intermediate values according to the Chinese remainder theorem; and verifying the signature on the basis of at least one public exponent. The method of testing includes: transmitting a plurality of messages to be signed by said electronic device; disturbing each message, including modifying the message by inserting an identical error for each message, before executing a step of determining one of the intermediate values; and analyzing physical measurements, obtained during the step of verifying the signature as a function of the message to be signed, the identical error for each message, and an assumption of a value of part of the secret parameter.

15 Claims, 4 Drawing Sheets

(56) References Cited

OTHER PUBLICATIONS

Marc Witteman: "A DPA attack on RSA in CRT mode", Riscure, The Netherlands, Jan. 1, 2011, pp. 1-9, XP055077282.
D. Boneh et al: "Fast variants of RSA", CryptoBytes, vol. 5, No. 1, pp. 1-9, 2002, Available Online at http://crypto.stanford.edu/~dabo/abstracts/fastrsa.html.
K. Hansen et al: "On the Efficiency of Fast RSA Variants in Modern Mobile Phones", International Journal of Computer Science and Information Security (IJCSIS), vol. 6, No. 3, 2009, pp. 1-5.
Don Coppersmith: "Finding a Small Root of a Bivariate Integer Equation; Factoring with high Bits Known", IBM Research, T.J. Watson Research Center, Yorktown Heights, NY 10598, USA, Springer-Verlag, 1998, pp. 178-189.

* cited by examiner (a)

(b)

METHOD FOR TESTING THE SECURITY OF AN ELECTRONIC DEVICE AGAINST AN ATTACK, AND ELECTRONIC DEVICE IMPLEMENTING COUNTERMEASURES

1. FIELD OF THE INVENTION

The field of the invention is that of cryptography.

More specifically, the invention pertains to a technique for testing the security of an electronic device against a side-channel attack combining a fault-injection attack and an analysis of consumption (and/or an analysis of electromagnetic emissions), as well as a protection technique aimed at preventing the disclosure of secret elements stored by the electronic device when such an attack is carried out.

The invention has numerous applications, for example in the field of smartcards which are used in many sectors of industry (such banking, identity applications, telephony, etc).

More generally, it can be applied in all cases where an electronic device can be manipulated in order to carry out side-channel attacks.

2. TECHNOLOGICAL BACKGROUND

Traditionally, when a cryptographic processing method (such as a digital signature) is implemented on an electronic device (in the form of either dedicated hardware or a set of software instructions to be executed by a processor contained in the electronic device), it is important to take account of the constraints induced by the existence of two major classes of attacks (namely, side-channel attacks and fault-injection attacks) to which all devices are electronically vulnerable.

Side-channel attacks consist in observing the normal working of an electronic device without damaging it. These are non-invasive attacks in which the physical effects of the computations on the embedded modules are observed. These observed effects are, for example, execution time, electromagnetic radiation or again consumption of current. The purpose of the observation is to retrieve secret data handled during the execution of a cryptographic processing method. The attacks known as SPA (Simple Power Analysis), DPA (Differential Power Analysis), SEMA (Simple ElectroMagnetic Analysis), and DEMA (Differential ElectroMagnetic Analysis) attacks are examples of side-channel attacks.

In fault-injection attacks, the efficient working of an electronic device is disturbed and an erroneous output is analyzed to obtain information on the secret data stored in this device.

In general, those skilled in the art try to prevent such attacks by incorporating special countermeasures when a cryptographic processing method is being carried out.

To obtain protection against fault-injection attacks, it is common practice either to duplicate the computation and then verify that the two results are equal or to add on an operation that checks the integrity of the computation to be protected.

Thus, in the example where a digital signature method (such as the signature method known as the RSA (Rivest, Shamir and Adleman) method, or one of its variants) has to be implemented, the most efficient technique to counter fault-injection attacks is to verify the result of the signing by using the public key if this public key is available.

One description of a generic implementation of the digital signature method known as the RSA-CRT (Chinese Remainder Theorem) protected, according to known techniques of the prior art, against the two classes of attacks mentioned here above is described with reference to FIG. 1.

However, such a digital signature method proves to be sensitive to any attack combining a side-channel attack and a fault-injection attack. The description of the technical problem formulated by the inventors is described with reference to FIG. 2 of the present patent application. It must be noted that detecting and formulating this security problem inherent in the use of the above-described digital signature method was not obvious to those skilled in the art.

The invention is therefore at least partly a problem invention, corresponding to the detection of this security flaw.

It must be noted that this problem of security exists in numerous implementations of a digital signature method considered to be secured, such as for example the one described in the document US 2010/0223478.

3. GOALS OF THE INVENTION

The invention, in at least one embodiment, is aimed especially at providing a technique for testing the security of an electronic device in order to guarantee an expected level of security of the electronic device.

At least one embodiment of the invention is also aimed at providing a technique for protecting an electronic device against a new attack combining a side-channel attack and a fault-injection attack.

It is another goal of at least one embodiment of the invention to provide a technique of this kind that is easy to implement, and requires few additional resources (in terms of memory or execution time).

4. SUMMARY OF THE INVENTION

One particular embodiment of the invention proposes a method for testing the security of an electronic device against a combination of a side-channel attack and a fault-injection attack implemented during an execution of a method of cryptographic processing comprising a step for delivering a signature of a message on the basis of at least one secret parameter, said step for delivering a signature implementing a recombination of at least two intermediate values according to the Chinese remainder theorem, and a step for verifying said signature on the basis of at least one public exponent. Such a method for testing is remarkable in that it comprises:
  a step for transmitting a plurality of messages to be signed by said electronic device;
  a step for disturbing each message, comprising a modification of said message by the insertion of an identical error for each message, before executing a step for determining one of the intermediate values;
  a step for analyzing physical measurements, obtained during said step for verifying said signature as a function of said message to be signed, said error which is identical for each message, and an assumption of a value of a part of said at least one secret parameter.

According to one particular characteristic, such a method for testing is remarkable in that said step for delivering a signature corresponds to a step for executing the RSA-CRT method of cryptographic processing.

According to one particular characteristic, such a method for testing is remarkable in that said step for delivering a signature corresponds to a step for executing variants of the RSA-CRT method of cryptographic processing.

According to one particular characteristic, such a method for testing is remarkable in that said step for analyzing physical measurements comprises a step for determining a coefficient of correlation between said physical measurements obtained and an estimation of a variable $m+\tilde{u} \bmod N$, where $\tilde{u}$ is said assumption of a value of a part of said at least one secret parameter, said coefficient being maximal when $\tilde{u}=f(\epsilon,p,i_p,$ N) or when $\tilde{u} = f(\epsilon, q, i_q, N)$, depending on the intermediate value disturbed by the execution of said step for disturbing, where m corresponds to said message, $\epsilon$ corresponds to a representation of said error introduced during the execution of said step for disturbing, p and q correspond to prime numbers which are parameters of the RSA-CRT method of cryptographic processing, N corresponds to the product of the prime numbers p and q, $i_p = p^{-1}$ mod q and $i_q = q^{-1}$ mod p, the operation mod corresponds to an operation of modular reduction, and the function $f$ is defined by one of the two following equations: $f(a,b,c,d) = a \cdot b \cdot c$ mod d and $f(a,b,c,d) = (a \cdot b \cdot c$ mod $d) - d$.

According to a particular characteristic, such a method for testing is remarkable in that said assumption of a value of a part of said at least one secret parameter is made byte by byte.

According to one particular characteristic, such a method for testing is remarkable in that when t less significant bits of the number $f(\epsilon, p, i_p, N)$ or the number $f(\epsilon, q, i_q, N)$ are obtained, the other bits are obtained via a step for resolving a polynomial equation $P(\epsilon, x) = x^2 + c(2^{t+1}k - 2^t\epsilon)x + ck(k-\epsilon) = 0$ mod N, where $c = 2^{-2t}$ mod N, and where k verifies $f(a, b, c, N) = 2^t x + k$ mod N.

According to one particular characteristic, a method for testing of this kind is remarkable in that, when said error $\epsilon$ is known and when $$t > \frac{1}{2}\log_2(N),$$

said polynomial equation is resolved through a use of the LLL algorithm.

According to one particular characteristic, such a method for testing is remarkable in that, when said error $\epsilon$ is unknown and when $$t > \frac{1}{2}\log_2(N) + s$$

where s is a size in bits of a representation of said error $\epsilon$, said polynomial equation is resolved through a use of the LLL algorithm.

One particular embodiment of the invention proposes an electronic device comprising means of cryptographic processing comprising means enabling the delivery of a signature of a message on the basis of at least one secret parameter, said means that enable the delivery of a signature further comprising means for recombining at least two intermediate values according to the Chinese remainder theorem, and means for verifying said signature from at least one public exponent. Such an electronic device is remarkable in that it comprises means of confusion implemented during a use of the means of cryptographic processing, said means of confusion preventing the establishment of a relationship between a result obtained following a use of the means for verifying, said message, an error introduced into said message when it is used to establish one of said two intermediate values and a part of at least one secret parameter, said relationship enabling an attack to be made by analysis of measurements of physical parameters sent out by said electronic device.

According to one particular embodiment, an electronic device of this kind is remarkable in that said means for verifying comprise said means of confusion.

According to one particular characteristic, an electronic device of this kind is remarkable in that said means for verifying comprise:
means for determining a variable equal to $((S'^e + \text{rand} - m)$ mod $r_1 N)$ mod N where S' is a result obtained following the use of the means for delivering a signature of a message m, N is a public modulus, rand is a random number smaller than N, $r_1$ is a random number and e is the public exponent;
means for comparing said variable obtained by the use of the means for determining with a random number rand;
means for detecting a fault-injection attack that transmit a piece of information on detection of a fault-injection attack if numbers compared by said means for comparing are different.

According to one particular characteristic, such an electronic device is remarkable in that said means for verifying comprise:
means for determining a variable equal to $((S'^{er_2} - m^{r_2})$ mod N) where S' is a result obtained following the use of means enabling the delivery of a signature of a message m, N is a public modulus, $r_2$ is a random number and e is the public exponent;
means for comparing said variable obtained by the use of means for determining with zero;
means for detecting a fault-injection attack that transmit a piece of information on detection of a fault-injection attack if the numbers compared by said means for comparing are different.

According to one particular characteristic, such an electronic device is remarkable in that said means for verifying comprise:
means for determining a variable equal to $(S'^e$ mod $r_3 N)$ mod $r_3$ where S' is a result obtained following the use of means for delivering a signature of a message m, N is a public modulus, $r_3$ is a random number and e is the public exponent;
means for comparing said variable obtained by the use of means for determining with m mod $r_3$;
means for detecting a fault-injection attack that transmit a piece of information on detection of a fault-injection attack if the numbers compared by said means for comparing are different.

According to one particular characteristic, such an electronic device is remarkable in that said means of confusion are used before the means for delivering a signature of a message and in that they comprise means for determining a message m' that is equal to $(m + r_4 N)$ mod $r_5 N$ where m is the message to be signed, N is a public modulus and the numbers $r_4$, $r_5$ are random numbers.

According to one particular characteristic, such an electronic device is remarkable in that the means for delivering a signature of a message are capable of delivering a signature according to the method known as the RSA-CRT method.

In another embodiment of the invention, there is proposed a method for securing a method of cryptographic processing comprising a step for delivering a signature of a message on the basis of at least one secret parameter, said step for delivering a signature comprising a step for recombining at least two intermediate values according to the Chinese remainder theorem, and a step for verifying said signature from at least one public exponent. The method for securing is remarkable in that it comprises a step of confusion that prevents the establishing of a relationship between a result obtained following the execution of the step for verifying, said message, an error produced in said message when it is used to establish one of said two intermediate values, and a part of at least one secret parameter, said relationship enabling the performance of an attack by analysis of measurements of physical parameters sent by said electronic device.

According to one particular characteristic, such a method for securing is remarkable in that said step of confusion is performed during the step for verifying.

According to one particular characteristic, such a method for securing is remarkable in that said step for verifying comprises:
- a step for determining a variable equal to $((S'^e+\text{rand}-m) \mod r_1 N) \mod N$ where $S'$ is the result obtained following the execution of the step for delivering a signature of a message m, N is a public modulus, rand is a random number smaller than N, $r_1$ is a random number and e is the public exponent;
- a step for comparing said variable obtained following the execution of the step for determining with the random number rand;
- a step for detecting a fault-injection attack which comprises a step for transmitting a piece of information for detecting a fault-injection attack if numbers compared during the step for comparing are different.

According to one particular characteristic, such a method for securing is remarkable in that said step for verifying comprises:
- a step for determining a variable equal to $((S'^{er_2}-m'^{r_2}) \mod N)$ where $S'$ is a result obtained following the execution of the step for delivering a signature of a message m, N is a public modulus, $r_2$ is a random number and e is the public exponent;
- a step for comparing said variable obtained following the execution of the step for determining with zero;
- a step for detecting a fault-injection attack that comprises a step for transmitting a piece of information on detection of a fault-injection attack if numbers compared during the step for comparing are different.

According to one particular characteristic, such a method for securing is remarkable in that said step for verifying comprises:
- step for determining a variable equal to $(S'^e \mod r_3 N) \mod r_3$ where $S'$ is a result obtained following the execution of the step for delivering a signature of a message m, N is a public modulus, $r_3$ is a random number and e is the public exponent;
- a step for comparing said variable obtained following the execution of the step for determining with $m \mod r_3$;
- a step for detecting a fault-injection attack that comprises a step for transmitting a piece of information for detecting a fault-injection attack if numbers compared during the step for comparing are different.

According to one particular characteristic, such a method for securing is remarkable in that the step of confusion is executed before the step for delivering a signature and in that the step of confusion comprises a step for determining a message m' which is equal to $(m+r_4 N) \mod r_5 N$ where m is the message to be signed, N is a public modulus and the numbers $r_4, r_5$ are random numbers.

According to one particular characteristic, such a method for securing is remarkable in that the step for delivering a signature comprises an execution of the method known as the RSA-CRT method.

Another embodiment of the invention proposes a computer program product comprising program code instructions to implement the above-mentioned methods (in any one of its different embodiments) when said program is executed on a computer.

Another embodiment of the invention proposes a computer-readable and non-transitory storage medium storing a computer program comprising a set of instructions executable by a computer to implement the above-mentioned method (in any one of its different embodiments).

Another embodiment of the invention proposes a computer program product comprising program code instructions to implement the above-mentioned methods (in any one of its different embodiments) when said program is executed on a computer.

Another embodiment of the invention proposes an electronic device comprising means adapted to implementing the above-mentioned methods (in any one of its different embodiments).

More specifically, according to a preferred implementation, the different steps of the method according to the invention are implemented by a software item or computer program, this software item comprising software instructions designed to be executed by a data processor of a relay module according to the invention and being designed to command the execution of the different steps of this method.

Consequently, the invention is also aimed at providing a program capable of being executed by a computer or by a data processor, this program comprising instructions to command the execution of the steps of a method as mentioned here above.

This program can use any programming language whatsoever and take the form of a source code, object code or intermediate code between a source code and an object code as in a partially compiled form or in any other desirable form whatsoever.

The invention is also aimed at obtaining an information carrier readable by a data processor and comprising instructions of a program as mentioned here above.

The information carrier can be any entity whatsoever of the device capable of storing the program. For example, the carrier can comprise a storage means such as a ROM, for example a CD-ROM or a microelectronic circuit ROM or again a magnetic recording means, for example a floppy disk or a hard disk drive.

Furthermore, the information carrier can be a transmissible carrier such as an electrical or optical signal which can be conveyed via an electrical or optical cable, by radio or by other means. The program according to the invention can be especially uploaded on to an Internet-type network.

As an alternative, the information carrier can be an integrated circuit into which the program is incorporated, the circuit being adapted to executing or to being used in the execution of the method in question.

According to one embodiment, the invention is implemented by means of software and/or hardware components. From this viewpoint, the term "module" can correspond in this document both to a software component and to a hardware component or to a set of hardware and software components.

A software component corresponds to one or more computer programs or to several sub-programs of a program or more generally to any element of a program or a software item capable of implementing a function or a set of functions as described here below for a module concerned. Such a software component is executed by a data processor of a physical entity (a terminal, server, etc) and is capable of accessing the hardware resources of this physical entity (memories, recording carriers, communications buses, input/output electronic boards, user interfaces, etc).

In the same way, a hardware component corresponds to any element of a hardware unit capable of implementing a function or a set of functions according to what is described here above for the module concerned. It can be a programmable hardware component or a component with an integrated processor for the execution of software, for example an integrated circuit, a smartcard, a memory card, an electronic card for executing firmware, a secure element used in the context of a near-field communications, etc.

5. LIST OF FIGURES

Other characteristics and advantages of the invention shall appear from the following description, given by way of a non-exhaustive indication, and from the appended drawings, of which:

FIG. 1 is a flowchart of a generic mode of implementation of the method of digital signing, known as the RSA-CRT method, additionally comprising a step for verifying in using the public key, secured against side-channel attacks and fault-injection attacks according to the prior art;

FIG. 2 presents a vulnerability intrinsic to implementations as described in FIG. 1;

FIG. 3 presents a flowchart of a particular embodiment of the method for testing security according to the invention;

6. DETAILED DESCRIPTION

In all the figures of the present document, the identical elements and steps are designated by a same numerical reference.

The present technique is applicable to the method of cryptographic processing comprising a step for delivering a signature according to the RSA-CRT cryptographic method and a step for verifying the signature obtained via a use of an exponent and of a modulus that are public. Here below in the description, only this embodiment is described in detail.

However, those skilled in the art could easily adapt the present technique when variants of the RSA-CRT method, such as that described in the article by K. Hansen et al, "*On the Efficiency of Fast RSA Variants in Modern Mobile Phones*" or else in the article by D. Boneh et al, "*Fast Variants of RSA*", are implemented in an electronic device (for example when the electronic device implements a RSA-CRT cryptographic method with multiple prime numbers (i.e. with a number of prime numbers greater than or equal to 3) or when the electronic device implements a particular RSA-CRT cryptographic method where the public modulus has the form $N=p^2q$, where p and q are prime numbers.

Figure 1:
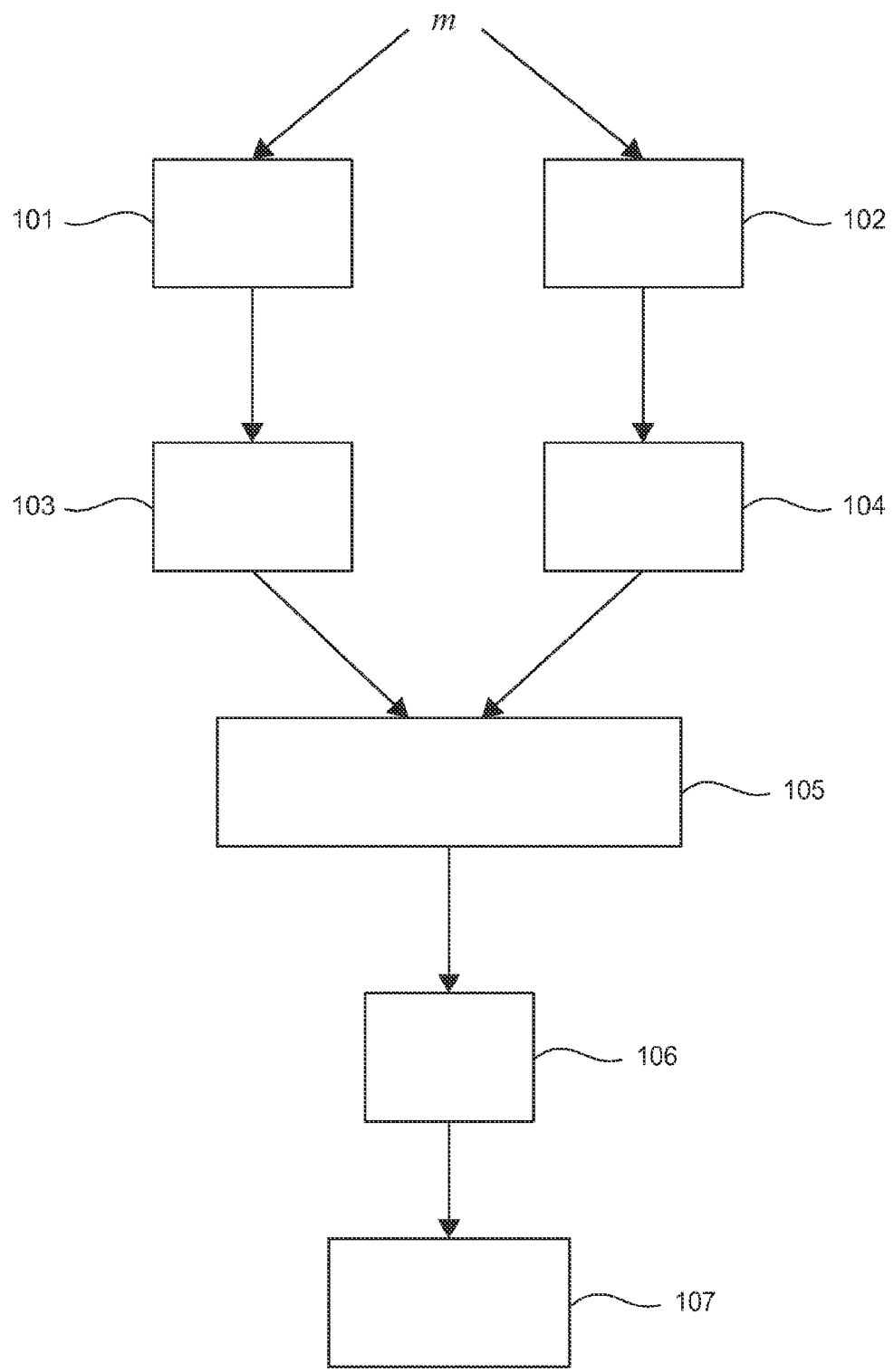

FIG. 1 is a flowchart of a generic mode of implementation of the method of digital signing known as the RSA-CRT method further comprising a step for verifying in using the public key, secured against side-channel attacks or fault-injection attacks according to the prior art.

When the electronic device has to deliver the electronic signature of a message m, it implements the digital signing method known as the RSA-CRT method further comprising a step for verifying in using the public key. Such a method corresponds to the succession of steps 101 to 107.

In a step 101, a message $m_p = m + k_0 p \mod k_1 p$ is determined, where the numbers $k_0$, $k_1$ are random numbers and the number p is a prime number (which is one of the parameters of the RSA).

In a step 102, a message $m_q = m + k_2 q \mod k_3 q$ is determined, where the numbers $k_2$, $k_3$ are random numbers and the number q s a prime number (which is one of the parameters of the RSA).

In a step 103, the electronic device carries out an exponentiation of the message $m_p$ which is resistant to SPA and DPA attacks. Thus, the step 103 is aimed at determining for example the value of $S'_p = m_p^{d_p+k_4(p-1)} \mod k_5 p$, where the numbers $k_4$, $k_5$ are random numbers and the number $d_p$ corresponds to $d \mod p-1$ where d is the private exponent in the method for digital signing known as the RSA-CRT method. It must be noted that we have $S_p = S'_p \mod p$, where $S_p = m_p^{d_p} \mod p$.

In a step 104, the electronic device carries out an exponentiation of the message $m_q$ which is resistant to SPA and DPA attacks. Thus, the step 104 is aimed at determining for example the value of $S'_q = m_q^{d_q k_6(q-1)} \mod k_7 q$, where the numbers $k_6$, $k_7$ are random numbers and the number $d_q$ corresponds to $d \mod q-1$. It must be noted that we have $S_q = S'_q \mod q$, where $S_q = m_q^{d_q} \mod q$.

The numbers $k_i$ used previously can be random 32-bit numbers or 64-bit numbers which are generated by the electronic device whenever the method for digital signing is executed.

In a step 105, the values obtained at output of the steps 104 and 103 are recombined (according to the Garner theorem or the Gauss theorem) using the Chinese remainder theorem and then, in a step 106, the result obtained at the output of the step 105 $S'_q + q \cdot (i_q \cdot (S'_p - S'_q) \mod k_5 p)$, is reduced through a modular reduction operation, using the modulus $N=p \cdot q$. Thus, we obtain a signature S of the message m, which must be verified to detect any fault-injection attack or attacks.

In a step 107, an exponentiation is performed in using the public exponent e in order to determine $S^e \mod N$, which has to be equal to the message m if no fault-injection attack has been made.

The method as described with reference to FIG. 1 is, as seen in the prior art, resistant to side-channel attacks as well as to fault-injection attacks.

Figure 2:
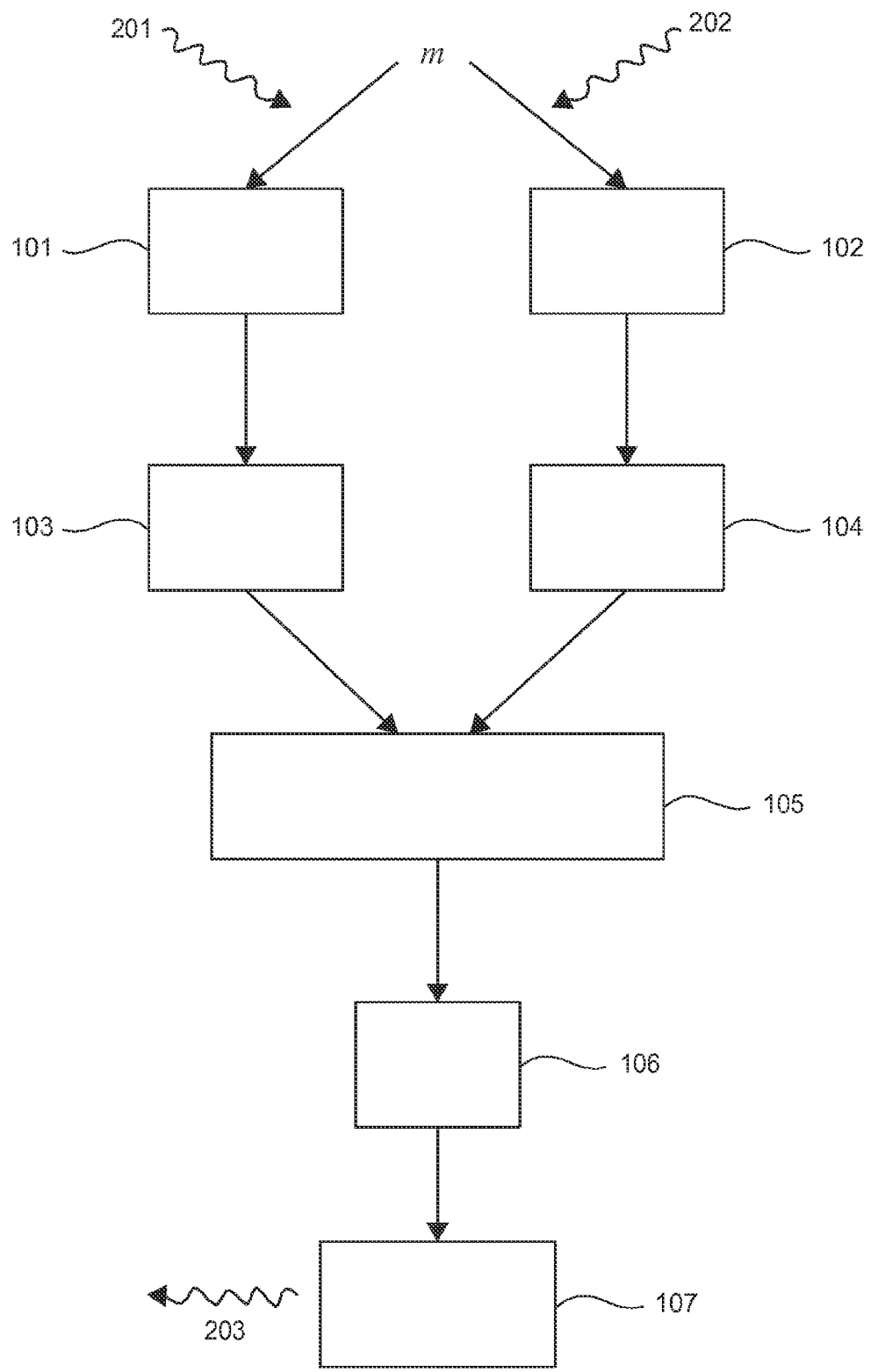

FIG. 2 presents a vulnerability intrinsic to implementations such as those described in FIG. 1.

Indeed, an attacker can make a side-channel attack during the execution of the step 10 by introducing an error E into the message m before the performance of the step 101, via the error-injection step 201, or before the performance of the step 102 via the error-injection step 202, seeking thereby to disturb the steps 101, 103 and the following steps or to disturb the steps 102, 104 and the following steps.

Indeed, such an attack can be implemented because when such an error is introduced for example via the error-injection step 201, an erroneous signature $\tilde{S}_1$ is obtained at the output of the step 106, which verifies the following equation:

$$\tilde{S}_1^e = m + \epsilon \cdot q \cdot i_q \mod N \text{ where } i_q = q^{-1} \mod p.$$

Indeed, by noting, according to the Gauss recombination, that $\tilde{S}_1^e - S^e = (p i_p \tilde{S}_q)^e + (q i_q \tilde{S}_p)^e - (p i_p S_q)^e + (q i_q S_p)^e \mod N = (q i_q)^e (\tilde{S}_p^e - S_p^e) \mod N$, with $\tilde{S}_p$ corresponding to an erroneous value of $S_p$, and that $(\tilde{S}_p^e - S_p^e) = \epsilon \mod p$, and $(\tilde{S}_p^e - S_p^e) = 0 \mod q$, we have: $\tilde{S}_1^e - S^e = (p i_p) \cdot 0 + (q i_q) \cdot \epsilon \mod N$.

Similarly, when an error is introduced, for example via the error-injection step 202, we obtain an erroneous signature $\tilde{S}_2$ at output from the step 106 which verifies the following equation: $\tilde{S}_2^e = m + \epsilon \cdot p \cdot i_p \mod N$ where $i_p = p^{-1} \mod q$.

Thus, an attacker can make a side-channel attack in order to obtain the value of $(\epsilon \cdot p \cdot i_p) \mod N$ (or $(\epsilon \cdot p \cdot i_p) \mod N-N$) or the value of $(\epsilon \cdot q \cdot i_q) \mod N$ (or $(\epsilon \cdot q \cdot i_q) \mod N-N$) from physical measurements obtained during a step 203. Once such a value has been obtained, the prime number p or q is retrieved by determining the greatest common divider between the value thus obtained and N.

The formulation of this problem of security is in itself novel and inventive.

Figure 3:
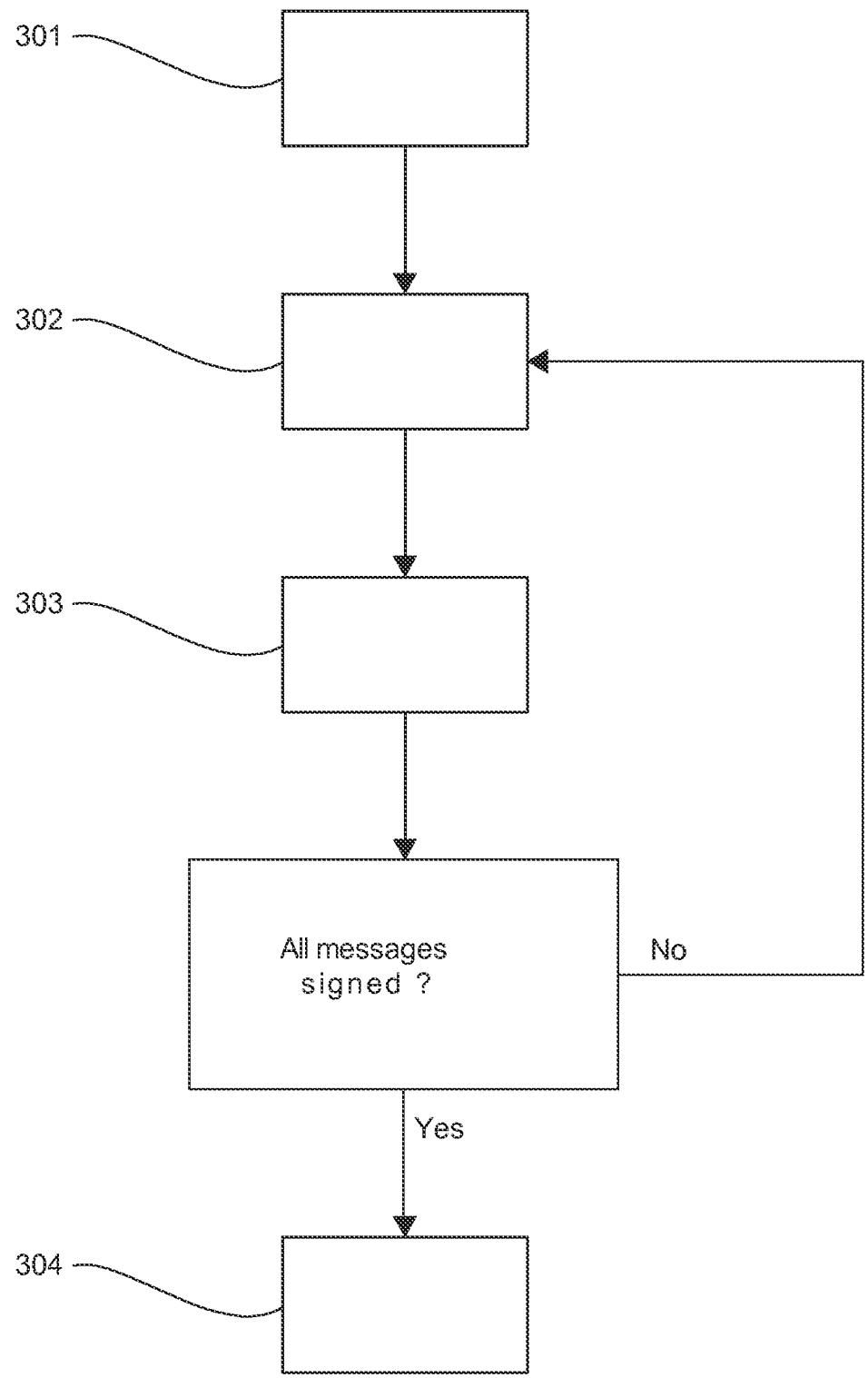

FIG. 3 presents a flowchart of a particular embodiment of the method for testing security according to the invention.

In this embodiment, it is assumed that a fault injection is still carried out at the step 201. Thus, only the determining of $S'_p$ is degraded through a modification of the message. Those skilled in the art could adapt this embodiment to the case where a fault injection is always done only according to the step 202.

The method for testing security of an electronic device against a combination of a side-channel attack and a fault-injection attack comprises:

a step 301 for generating a plurality of messages $m_i$ with i being an integer ranging from 1 to $N_1$, where $N_1$ is a large number (the value of $N_1$ possibly varying from 10,000 to several hundreds of thousands);

a step for delivering a signature 302 which consists, for each message $m_i$, in delivering a signature by means of the electronic device in injecting a same error $\epsilon$ during a step 201 into the message to be signed;

a step for collecting information 303 during the performance of a step for verifying the signature 107 (which is therefore still erroneous), which consists in using sensors to pick up measurements of the physical parameters sent by the electronic devices (consumption curves, etc.);

a step of analysis 304 of the measurements of the physical parameters performed once all the messages $m_i$ have been signed, this step comprising a step for determining a coefficient of correlation in making an assumption on the value of $\epsilon \cdot q \cdot i_q \bmod N$, or of $(\epsilon \cdot q \cdot i_q) \bmod N-N$.

Through the size of $\epsilon \cdot q \cdot i_q \bmod N$, it is necessary to make an assumption for one byte of the value of $\epsilon \cdot q \cdot i_q \bmod N$, and to reiterate the step for determining a coefficient of correlation on another byte. This observation is also valid for the size of $(\epsilon \cdot q \cdot i_q) \bmod N-N$.

In one variant, the step of analysis 304 can be executed concomitantly with the steps 302 and 303 when a certain number of signatures are collected.

In one variant, the step of analysis further comprises a step for resolving a polynomial equation comprising a step for using the algorithm known as the LLL algorithm.

More specifically, when we obtain t less significant bits of the number $\epsilon \cdot q \cdot i_q \bmod N$, it is possible to establish the following relationship:

$\epsilon \cdot q \cdot i_q = 2^t x + k \bmod N$, where the values of t and of k are known and where the value of x, with a size of ceil($\log_2(N)$−t), with the function ceil corresponding to the next higher integer is unknown. To determine the value of x, it is enough to resolve the following polynomial equation: $P(\epsilon,x)=x^2+c(2^{t+1}k-2^t\epsilon)x+ck(k-\epsilon)=0 \bmod N$, where $c=2^{-2t} \bmod N$.

Indeed, by application of the Bezout theorem, we have $pi_p+qi_q=1 \bmod N$. We therefore have $\epsilon \cdot pi_p=\epsilon-2^t x-k \bmod N$.

Then, by multiplying $\epsilon \cdot pi_p$ by $\epsilon \cdot q \cdot i_q$ and by using the preceding relationships we get $\epsilon \cdot pi_p \cdot \epsilon \cdot q \cdot i_q = (2^t x+k)\cdot(\epsilon-2^t x-k)=0 \bmod N$.

When the value of the error $\epsilon$ is known, and when $t > \frac{1}{2} \log_2(N)$, then the necessary conditions (described in the article by D. Coppersmith, "*Finding a small root of bivariate integer equation*") for resolving this polynomial equation via the use of the LLL algorithm are fulfilled.

When the value of the error $\epsilon$ is unknown and when $t > \frac{1}{2} \log_2(N)$, then the necessary conditions (described by D. Coppersmith, "*Finding a small root of bivariate integer equation*") for resolving this polynomial equation via the use of the LLL algorithm are fulfilled.

Such a method for testing security can be implemented for example by a system comprising a measuring instrument (such as for example an oscilloscope) in order to pick up physical measurements of parameters related to an internal state of the electronic device the security of which has to be evaluated and a computer capable of carrying out operations of analysis and coordination within the system.

Figure 4:
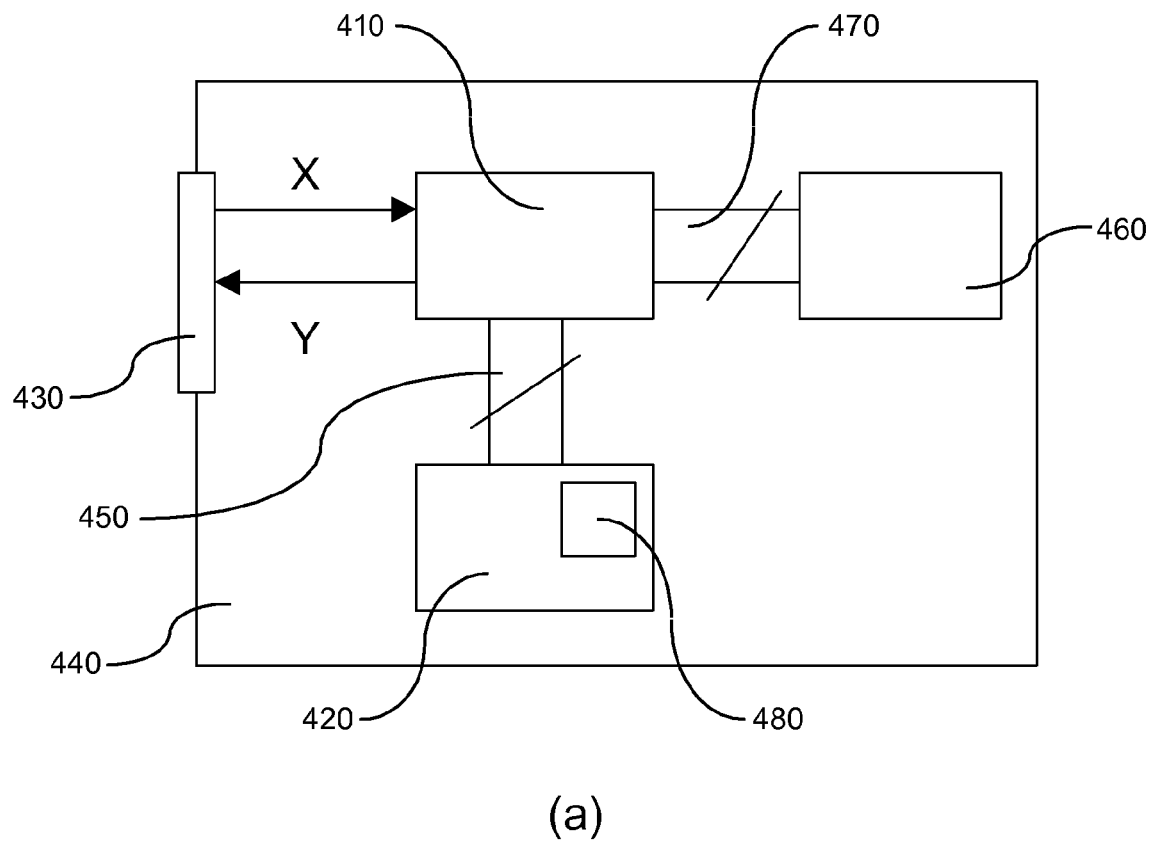
FIG. 4(a) is a schematic representation of an electronic device in which the present invention is implemented.
FIG. 4(b) represents a microcircuit board constituting an example of an electronic device compliant with the invention as represented in FIG. 4(a).
Figure 4:
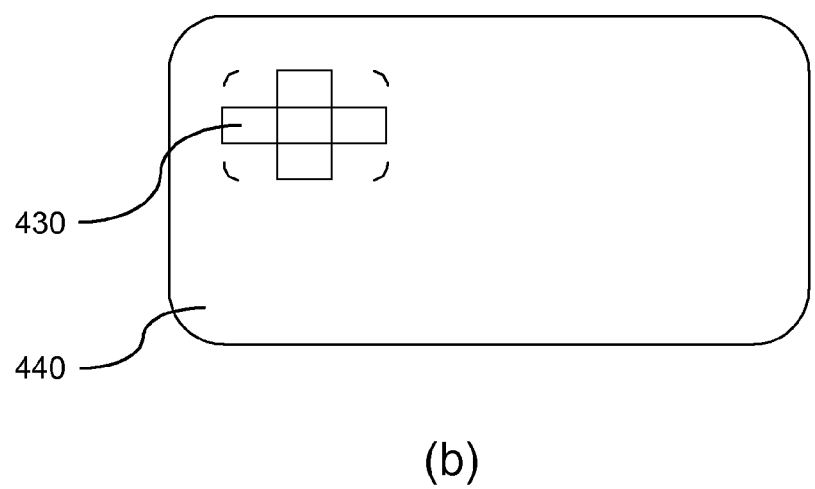

FIG. 4(*a*) schematically represents an electronic device 440 in which the present invention is implemented.

This device 440 comprises a microprocessor 410 with which there is associated on the one hand a random-access memory 460, for example by means of a bus 470 and, on the other hand, a non-volatile memory 420 (for example of the EEPROM type), for example through a bus 450.

The data-processing device 440 and specifically the microprocessor 410 that it incorporates can exchange data with external devices by means of a communications interface 430.

FIG. 4(*a*) schematically represents the transmission of a piece of input data X received by an external device (not shown) and transmitted from the communications interface 430 to the microprocessor 410. Similarly, the figure represents the transmission of a piece of output data Y sent from the microprocessor 410 to the communications interface 430 and intended for an external device. This piece of output data Y comes from a data-processing operation by the microprocessor 410, generally carried out on the piece of input data X by means of a piece of secret data 480 internal to the system, for example a private key or a random number.

The pieces of input data X are for example APDU commands and the pieces of output data are APDU responses.

Although, for the sake of illustration, the input data and the output data are represented on two different arrows, the physical means that enable communications between the microprocessor 410 and the interface 430 could be made by only one set of means, for example a series communications port or a bus.

The microprocessor 410 is capable of executing a piece of software (or a computer program) that enables the electronic device 440 to execute a method capable of thwarting an attack as described in this document. A method of this kind is for example executed by the microprocessor 440 upon reception of the input data X. The data of the method according to the invention can be obtained from the input data or from the non-volatile memory 420. The pieces of output data are for example obtained from the result of the method according to the invention. Such output data can be information on the detection of a fault-injection attack. The software item consists of a series of commands from the microprocessor 410 which are for example stored in the memory 420.

In one variant, the unit formed by the microprocessor 410 and the non-volatile memory 420 and the random-access memory 460 can be replaced by a specific application which then comprises means for carrying out the different steps of the data-processing method. More generally, the processing device is an integrated circuit.

FIG. 4(*b*) represents a microcircuit card constituting an example of an electronic device according to the invention as represented in FIG. 4(*a*). The communications interface 430 in this case is obtained by means of contacts of the microcircuit card or else an antenna housed in the card body. The microcircuit card incorporates a microprocessor 410, a random-access memory 460 and a non-volatile memory 420 as shown in FIG. 4(*a*).

This microcircuit card is for example compliant with the ISO 7816 standard and provided with a secured microcontroller which groups together the microprocessor (or CPU) 420 and the random-access memory 460.

The pieces of input data X are for example APDU commands and the pieces of output data are APDU responses.

In one variant, the data-processing device can be a USB key, a document or a paper information carrier comprising, in one of its sheets, a microcircuit associated with contactless communications means. In a preferred way, this is a portable or hand-held electronic entity.

The device is for example secured. For example, the device comprises means capable of protecting it against attacks aimed at fraudulently obtain the secret data that it memorizes (for example a cryptographic key). These are attacks such as fault-injection attacks and/or side-channel attacks. In particular, the device complies with the FIPS standard or with the common criteria.

The invention claimed is:

1. A method for testing the security of an electronic device against a combination of a side-channel attack and a fault-injection attack implemented during an execution, in the electronic device, of a method of cryptographic processing that includes a step of delivering a signature of a message on the basis of at least one secret parameter, said step of delivering a signature implementing a recombination of at least two intermediate values according to the Chinese remainder theorem, and a step of verifying said signature on the basis of at least one public exponent, wherein the method for testing comprises:
a step of transmitting a plurality of messages to be signed by said electronic device;
a step of disturbing each message, comprising a modification of said message by the insertion of an identical error into said message, before executing a step of determining one of the intermediate values to be recombined during the step of delivering a signature of said message;
a step of obtaining physical measurements during said step of verifying said signature;
a step of analyzing said physical measurements as a function of said message to be signed, said identical error, and an assumption of a value of a part of said at least one secret parameter.

2. The method for testing security according to claim 1, wherein said step of delivering a signature corresponds to a step of executing an RSA-CRT method of cryptographic processing.

3. The method for testing security according to claim 1, wherein said step of delivering a signature corresponds to a step of executing variants of an RSA-CRT method of cryptographic processing.

4. The method for testing security according to claim 2, wherein said step of analyzing physical measurements comprises a step of determining a coefficient of correlation between said physical measurements obtained and an estimation of a variable m+ũ mod N, where ũ is said assumption of a value of a part of said at least one secret parameter, said coefficient being maximal when $ũ=f(\epsilon,p,i_p,N)$ or when $ũ=f(\epsilon,q,i_q,N)$, depending on the intermediate value disturbed by the execution of said step of disturbing, where m corresponds to said message, $\epsilon$ corresponds to a representation of said error introduced during the execution of said step of disturbing, p and q correspond to prime numbers which are parameters of the RSA-CRT method of cryptographic processing, N corresponds to the product of the prime numbers p and q, $i_p=p^{-1}$ mod q and $i_q=q^{-1}$ mod p, the operation mod corresponds to an operation of modular reduction, and the function $f$ is defined by one of the two following equations: $f(a,b,c,d)=a.b.c \bmod d$ and $f(a,b,c,d)=(a.b.c \bmod d)-d$.

5. The method for testing security according to claim 4, wherein said assumption of a value of a part of said at least one secret parameter is made byte by byte.

6. The method for testing security according to claim 4, wherein when t less significant bits of the number $f(\epsilon,p,i_p,N)$ or the number $f(\epsilon,q,i_q,N)$ are obtained, the other bits are obtained via a step of resolving a polynomial equation $P(\epsilon,x)=x^2+c(2^{t-1}k-2^t\epsilon)x+ck(k-\epsilon)=0 \bmod N$, where $c=2^{-2t} \bmod N$, and where k verifies $f(a,b,c,N)=2^t x+k \bmod N$.

7. The method for testing security according to claim 6, wherein, when said error $\epsilon$ is known and when $t<1/2 \log_2(N)$, said polynomial equation is resolved through a use of an LLL algorithm.

8. The method for testing security according to claim 6, wherein, when said error $\epsilon$ is unknown and when $t>1/2 \log_2(N)$, s where s is a size in bits of a representation of said error $\epsilon$, said polynomial equation is resolved through a use of an LLL algorithm.

9. An electronic device comprising:
means for cryptographic processing comprising means for delivery of a signature of a message on the basis of at least one secret parameter, said means for delivery of a signature further comprising means for recombining at least two intermediate values according to the Chinese remainder theorem, and means for verifying said signature from at least one public exponent; and
means for confusion implemented during a use of the means for cryptographic processing, said means for confusion preventing establishment of a relationship between a result obtained following a use of the means for verifying, said message, an error introduced into said message when the message is used to establish one of said two intermediate values and a part of at least one secret parameter, said relationship enabling an attack to be made by analysis of measurements of physical parameters sent out by said electronic device.

10. The electronic device according to claim 9, wherein said means for verifying comprise said means for confusion.

11. The electronic device according to claim 10, wherein said means for verifying comprise:
means for determining a variable equal to $((S'^E+\text{rand}-m) \bmod r_1 N)$ where S' is a result obtained following the use of the means for delivering a signature of a message m, N is a public modulus, rand is a random number smaller than N, $r_1$ is a random number and e is the public exponent;
means for comparing said variable obtained by the use of the means for determining with the random number rand; and
means for detecting a fault-injection attack that transmit a piece of information on detection of a fault-injection attack if numbers compared by said means for comparing are different.

12. The electronic device according to claim 10, wherein said means for verifying comprise:
means for determining a variable equal to $((S'^{er_2}-m^{r_2}) \bmod N)$ where S' is a result obtained following the use of means enabling the delivery of a signature of a message m, N is a public modulus, $r_2$ is a random number and e is the public exponent;
means for comparing said variable obtained by the use of means for determining with zero; and
means for detecting a fault-injection attack that transmit a piece of information on detection of a fault-injection attack if the numbers compared by said means for comparing are different.

13. The electronic device according to claim 10, wherein said means for verifying comprise:

means for determining a variable equal to $(S'^e \bmod n_2 N) \bmod r_2$ where S' is a result obtained following the use of means for delivering a signature of a message m, N is a public modulus, $r_2$ is a random number and e is the public exponent;

means for comparing said variable obtained by the use of means for determining with $m \bmod r_2$; and means for detecting a fault-injection attack that transmit a piece of information on detection of a fault-injection attack if the numbers compared by said means for comparing are different.

14. The electronic device according to claim 9, wherein said means for confusion are used before the means for delivering a signature of a message, and comprise means for determining a message m' that is equal to $(m+r_4 N) \bmod r_2 N$ where m is the message to be signed, N is a public modulus and the numbers $r_4$, $r_5$ are random numbers.

15. The electronic device according to claim 9, wherein the means for delivering a signature of a message are capable of delivering a signature according to an RSA-CRT method.

\* \* \* \* \*